US012540109B2

(12) United States Patent
Schoonebeek et al.

(10) Patent No.: US 12,540,109 B2
(45) Date of Patent: Feb. 3, 2026

(54) ETHANE OXIDATIVE DEHYDROGENATION PROCESS

(71) Applicant: SHELL OIL COMPANY

(72) Inventors: Ronald Jan Schoonebeek, Amsterdam (NL); Guus Van Rossum, Amsterdam (NL); Alouisius Nicolaas Renée Bos, Amsterdam (NL); Ivana Daniela Esposito Cassibba, Amsterdam (NL); Matthew Adam Christiansen, Houston, TX (US)

(73) Assignee: SHELL USA, INC., Houston, TX (US)

( * ) Notice: Subject to any disclaimer, the term of this patent is extended or adjusted under 35 U.S.C. 154(b) by 69 days.

(21) Appl. No.: 18/002,095

(22) PCT Filed: Sep. 11, 2020

(86) PCT No.: PCT/EP2020/075452
§ 371 (c)(1),
(2) Date: Dec. 16, 2022

(87) PCT Pub. No.: WO2022/002421
PCT Pub. Date: Jan. 6, 2022

(65) Prior Publication Data
US 2023/0286885 A1    Sep. 14, 2023

(30) Foreign Application Priority Data

Jun. 30, 2020   (EP) .................................. 20183085

(51) Int. Cl.
*C07C 5/48* (2006.01)
*B01J 23/28* (2006.01)
*B01J 27/057* (2006.01)

(52) U.S. Cl.
CPC ................ *C07C 5/48* (2013.01); *B01J 23/28* (2013.01); *B01J 27/0576* (2013.01); *B01J 2523/55* (2013.01); *B01J 2523/56* (2013.01); *C07C 2523/28* (2013.01)

(58) Field of Classification Search
None
See application file for complete search history.

(56) References Cited

U.S. PATENT DOCUMENTS

| 5,997,826 | A | 12/1999 | Lodeng et al. |
| 7,091,377 | B2 | 8/2006 | Borgmeier et al. |
| 7,319,179 | B2 | 1/2008 | Lopez Nieto et al. |
| 8,846,996 | B2 | 9/2014 | Kustov et al. |
| 9,156,764 | B2 | 10/2015 | Han et al. |
| 10,357,754 | B2 | 7/2019 | Simanzhenkov et al. |
| 10,526,269 | B2 | 1/2020 | Roelofszen et al. |
| 10,752,564 | B2 | 8/2020 | Schoonebeek et al. |
| 10,815,170 | B2 | 10/2020 | Bos et al. |
| 11,078,134 | B2 | 8/2021 | Mitkidis et al. |
| 11,401,220 | B2 | 8/2022 | Bos et al. |

| 2004/0147393 | A1 | 7/2004 | Hibst et al. |
| 2010/0256432 | A1* | 10/2010 | Arnold ..................... C07C 5/48 585/655 |
| 2015/0141727 | A1 | 5/2015 | Simanzhenkov et al. |
| 2019/0194091 | A1 | 6/2019 | Mitkidis et al. |
| 2019/0248717 | A1* | 8/2019 | Gaffney ............... B01J 19/2415 |
| 2020/0123085 | A1 | 4/2020 | Olayiwola et al. |
| 2020/0223768 | A1 | 7/2020 | Van Rossum et al. |
| 2020/0223769 | A1 | 7/2020 | Calvo et al. |

FOREIGN PATENT DOCUMENTS

| EP | 0261264 | A1 | 3/1988 | |
| RU | 2668227 | C1 | 9/2018 | |
| WO | 2014090841 | A2 | 6/2014 | |
| WO | WO-2017144584 | A1 * | 8/2017 | ............... B01J 8/04 |

OTHER PUBLICATIONS

Office Action Received for Azerbaijan Application No. 20220208, Mailed on Apr. 28, 2023, 4 Pages (2 Pages of English Translation and 2 Pages of Official Copy).
International Search Report and Written Opinion Received for PCT Patent Application No. PCT/EP2021/067758, Mailed on Sep. 28, 2021, 11 Pages.
Notice of Allowance Received for Kazakhstan Application No. 2023/0055.1, Mailed on Apr. 5, 2024, 13 Pages (5 Pages of English Translation and 8 Pages of Official Copy).
International Search Report and Written Opinion received for PCT Patent Application No. PCT/EP2020/075452, mailed on Mar. 22, 2021, 08 pages.
International Search Report and Written Opinion received for PCT Patent Application No. PCT/EP2021/071637, mailed on Oct. 28, 2021, 08 pages.
International Search Report and Written Opinion received for PCT Patent Application No. PCT/EP2021/067757, mailed on Sep. 21, 2021, 08 pages.

(Continued)

*Primary Examiner* — In Suk C Bullock
*Assistant Examiner* — Alyssa L Cepluch
(74) *Attorney, Agent, or Firm* — SHELL USA, INC.

(57) ABSTRACT

The invention relates to a process for the production of ethylene by oxidative dehydrogenation (ODH) of ethane, comprising: a) supplying ethane and oxygen to a first ODH zone which is formed by multiple reactor tubes containing a mixed metal oxide ODH catalyst bed; b) contacting the ethane and oxygen with the catalyst resulting in multiple effluent streams, wherein the multiple reactor tubes are cooled by a coolant; c) mixing at least a portion of the multiple effluent streams from step b) resulting in a mixture comprising ethylene, unconverted ethane and unconverted oxygen; d) supplying at least a portion of the mixture from step c) to a second ODH zone containing a mixed metal oxide ODH catalyst bed; e) contacting at least a portion of the mixture from step c) with the catalyst in the second ODH zone resulting in a stream comprising ethylene and unconverted ethane.

10 Claims, No Drawings

(56) References Cited

OTHER PUBLICATIONS

Office Action Received for Chinese Application No. 2020801024967, Mailed on Jul. 26, 2024, 14 Pages(08 Pages of English Translation and 06 Pages of Official Copy).
Office Action Received for Taiwan Application No. 110123579, Mailed on Dec. 25, 2024, 20 Pages(12 Pages of English Translation and 08 Pages of Official Copy).

* cited by examiner

ETHANE OXIDATIVE DEHYDROGENATION PROCESS

CROSS REFERENCE TO RELATED APPLICATIONS

This is a National stage application of International Application No. PCT/EP2020/075452, filed 11 Sep. 2020, which claims priority of European Application No. 20183085.8, filed 30 Jun. 2020 which is incorporated herein by reference in its entirety.

FIELD OF THE INVENTION

The present invention relates to a process for the production of ethylene by oxidative dehydrogenation (oxydehydrogenation; ODH) of ethane.

BACKGROUND OF THE INVENTION

It is known to oxidatively dehydrogenate alkanes, such as alkanes containing 2 to 6 carbon atoms, for example ethane or propane resulting in ethylene and propylene, respectively, in an oxidative dehydrogenation (oxydehydrogenation; ODH) process. Examples of alkane ODH processes, including catalysts and other process conditions, are for example disclosed in U.S. Pat. No. 7,091,377, WO2003064035, US20040147393, WO2010096909 and US20100256432. Mixed metal oxide catalysts containing molybdenum (Mo), vanadium (V), niobium (Nb) and optionally tellurium (Te) as the metals, can be used as such oxydehydrogenation catalysts.

In particular, in an ethane ODH process oxygen may be used as the oxidizing agent. In addition to ethylene and unconverted ethane, ethane ODH effluent may comprise unconverted oxygen. Generally, in order to avoid the risk of operating the ethane ODH process at oxygen depletion conditions, especially near the outlet of an ODH reactor, more oxygen is fed than required in which case the ethane ODH effluent comprises unconverted oxygen. However, on the other hand, having unconverted oxygen in the ODH effluent increases the risk of explosion hazards because of the presence of hydrocarbons (ethane; ethylene) in combination with a relatively high oxygen concentration in the back-end separation section, in which section distillation may be applied to achieve the desired separations. In addition, such unconverted oxygen may be involved in some undesired trace chemistry, for example resulting in peroxides which as such could also result in an unwanted risk of explosion hazards.

In view of the above, it is desired to remove unconverted oxygen from ODH effluent before the latter effluent enters the above-mentioned back-end separation section.

WO2018153831 discloses a process for the production of ethylene by oxidative dehydrogenation of ethane, wherein unconverted oxygen is removed from the ethane ODH effluent, after first having removed water from such effluent, through oxidation of carbon monoxide and acetylene by that unconverted oxygen in a separate step before the back-end separation section. Said acetylene may be produced by a further oxidative dehydrogenation of ethylene. According to WO2018153831, a preferred oxidation catalyst that may be used in such oxygen removal step, is a catalyst which comprises copper and/or platinum.

Thus, in the process of above-mentioned WO2018153831, carbon monoxide and acetylene are also removed simultaneously together with unconverted oxygen. Removal of carbon monoxide and acetylene is beneficial because they may cause problems in downstream conversion processes. For example, carbon monoxide and/or acetylene may be a poison to a catalyst used in such further downstream conversion process resulting in a reduced catalyst activity. An example of such downstream conversion process is a process wherein the ethylene product of the ethane ODH process is further converted. Further, there may not be sufficient capacity for the removal of carbon monoxide and acetylene, for example by distillation, in the back-end separation section which is also downstream of the ethane ODH step.

Further, above-mentioned WO2018153831 advises against feeding less oxygen to the ODH reactor and/or fully converting the oxygen in the ODH reactor. For this is described in WO2018153831 as a less desired alternative, as compared to a case where more oxygen than required is fed to the ODH reactor and the ethane ODH effluent comprises unconverted oxygen. The solution according to WO2018153831, as a replacement of said less desired alternative, is to include the above-described separate oxygen removal step downstream of the ODH step. However, this separate oxygen removal step implies that there is a delicate balance between the operation of the ODH reactor and the operation of the oxygen removal reactor, since the removal of carbon monoxide and acetylene from the ODH effluent is coupled to the removal of unconverted oxygen which is present in said same ODH effluent. That is to say, unconverted oxygen from the ODH effluent is used to oxidize (combust) carbon monoxide and acetylene into carbon dioxide.

The above-mentioned mutual dependence between the removal of unconverted oxygen and the removal of carbon monoxide and acetylene may be cumbersome. First of all, in case there is too little unconverted oxygen in the ODH effluent, not all carbon monoxide and acetylene would be removed by oxidation. In such case, additional oxygen may be fed to the oxygen removal step to fully convert all carbon monoxide and acetylene into carbon dioxide, as is disclosed in above-mentioned WO2018153831. However, having to add additional oxygen is a cumbersome additional step, requiring determining precisely how much oxygen to add. And further, in case there is too much unconverted oxygen in the ODH effluent and all carbon monoxide and acetylene would be removed by oxidation, still some unconverted oxygen remains after the oxygen removal step. In such case, additional combustible components, such as hydrocarbons or hydrogen ($H_2$), may be fed to the oxygen removal step to fully convert all oxygen. However, having to add additional combustible components is also a cumbersome additional step, requiring determining precisely how much of these components to add.

Furthermore, another general disadvantage of the oxygen removal step in the process of above-mentioned WO2018153831 is that carbon dioxide is produced, which also needs to be separated from the effluent in a separate carbon dioxide removal step. This is even more disadvantageous when considering that as an alternative to oxidation of acetylene into carbon dioxide, such acetylene may be hydrogenated into ethylene instead, thereby increasing the overall yield of ethylene while at the same time minimizing the formation of carbon dioxide. Such hydrogenation into ethylene is a conventional way of removing acetylene. For example, acetylene may be removed from a stream comprising the desired ethylene and the undesired acetylene by selective hydrogenation of the acetylene to ethylene. Such stream may originate from a so-called "C2 splitter" column wherein ethane is separated from ethylene by means of cryogenic distillation, wherein a relatively high pressure and a relatively low (cryogenic) temperature are applied.

Therefore, it may be an object to provide an ethane oxidative dehydrogenation process wherein there is no longer a need to couple (i) the removal of carbon monoxide and acetylene from the ODH effluent and (ii) the removal of unconverted oxygen which is present in said same ODH effluent, in a separate oxygen removal step downstream of the ODH step, thereby avoiding the above-described disadvantages associated with such separate oxygen removal step, by applying such ODH reactor configuration and operating it in such way which results in that the ODH effluent coming from such reactor configuration comprises no or substantially no unconverted oxygen.

Further, it may be an object to provide such process wherein ODH reaction conditions in the above-mentioned ODH reactor configuration can be optimized, which process is technically advantageous, efficient and affordable. Such technically advantageous process would preferably result in a lower energy demand and/or lower capital expenditure. More specifically, it may be an object to provide such process wherein ODH reaction conditions in the above-mentioned ODH reactor configuration can be set such that the long-term stability of an ODH catalyst, in particular a mixed metal oxide catalyst containing molybdenum, vanadium, niobium and optionally tellurium, in a catalyst bed in said ODH reactor configuration can be improved, especially in a downstream part of such configuration.

Still further, it may be an object to provide a different process using the above-mentioned ODH reactor configuration, wherein carbon monoxide and acetylene can be removed from alkane ODH effluent, in a way different from the above-mentioned oxygen removal step wherein carbon monoxide and acetylene are oxidized by unconverted oxygen coming from an upstream ODH step, which different process is technically advantageous, efficient and affordable. Such technically advantageous process would preferably result in a lower energy demand and/or lower capital expenditure.

SUMMARY OF THE INVENTION

Surprisingly, it was found that one or more of the above-mentioned objects may be achieved in a process for the production of ethylene by oxidative dehydrogenation (ODH) of ethane, wherein at least two oxidative dehydrogenation zones arranged in series are used, which zones contain a mixed metal oxide catalyst, and wherein ethane and oxygen are supplied to the first oxidative dehydrogenation zone which is formed by multiple reactor tubes containing the catalyst, and at least a portion of the multiple effluent streams coming from these multiple tubes are mixed resulting in a mixture comprising ethylene, unconverted ethane and unconverted oxygen, at least a portion of which mixture is then supplied to the second oxidative dehydrogenation zone in series for further conversion of unconverted ethane and unconverted oxygen.

Accordingly, the present invention relates to a process for the production of ethylene by oxidative dehydrogenation of ethane, comprising:
a) supplying ethane and oxygen to a first oxidative dehydrogenation zone which is formed by multiple reactor tubes containing a catalyst bed containing an oxidative dehydrogenation catalyst which is a mixed metal oxide catalyst;
b) contacting the ethane and oxygen with the catalyst in the multiple reactor tubes in the first oxidative dehydrogenation zone resulting in multiple effluent streams, wherein the multiple reactor tubes are cooled by a coolant;
c) mixing at least a portion of the multiple effluent streams from step b) resulting in a mixture comprising ethylene, unconverted ethane and unconverted oxygen;
d) supplying at least a portion of the mixture from step c) to a second oxidative dehydrogenation zone containing a catalyst bed containing an oxidative dehydrogenation catalyst which is a mixed metal oxide catalyst;
e) contacting at least a portion of the mixture from step c) with the catalyst in the second oxidative dehydrogenation zone resulting in a stream comprising ethylene and unconverted ethane.

DETAILED DESCRIPTION OF THE INVENTION

The process of the present invention comprises steps a), b), c), d) and e). Said process may comprise one or more intermediate steps between steps a) and b), between steps b) and c), between steps c) and d), and between steps d) and e). Further, said process may comprise one or more additional steps preceding step a) and/or following step e).

While the process of the present invention and the stream or streams used in said process are described in terms of "comprising", "containing" or "including" one or more various described steps or components, they can also "consist essentially of" or "consist of" said one or more various described steps or components.

In the context of the present invention, in a case where a stream comprises two or more components, these components are to be selected in an overall amount not to exceed 100 vol. % or 100 wt. %.

Within the present specification, "substantially no" means that no detectable amount of the component in question is present.

In the present invention, the first and second oxidative dehydrogenation zones may be comprised within the same reactor vessel or, preferably, within separate reactor vessels arranged in series, the or each reactor vessel comprising a reactor shell. The first oxidative dehydrogenation zone is formed by multiple reactor tubes containing a catalyst bed. The second oxidative dehydrogenation zone also contains a catalyst bed and may also be formed by multiple reactor tubes. In case an oxidative dehydrogenation zone is formed by multiple reactor tubes, these tubes are disposed within an interior of the reactor shell of the reactor vessel. Further, in such case, it is preferred that a coolant circuit is fluidly connected to that part of the reactor vessel which contains the multiple reactor tubes, so that the multiple reactor tubes may be cooled by a coolant from that coolant circuit which coolant may be supplied to that shell space of the reactor vessel which contains the multiple reactor tubes. Alternatively, the second oxidative dehydrogenation zone is not formed by multiple reactor tubes, and may be operated adiabatically without using a coolant. For example, the second oxidative dehydrogenation zone may be comprised within a single reactor containing a single catalyst bed, separate from the first oxidative dehydrogenation zone. Further, for example, the second oxidative dehydrogenation zone may be comprised within the bottom part of the reactor vessel comprising the first oxidative dehydrogenation zone which bottom part may have a dome shape and which bottom part is also separate from the first oxidative dehydrogenation zone. The catalyst beds in the first and second oxidative dehydrogenation zones may be any type of bed, including fixed beds and fluidized beds. Suitably, these catalyst beds are fixed beds.

In the present invention, the first oxidative dehydrogenation zone may comprise one oxidative dehydrogenation zone, which is preferred, but it may also comprise two or more oxidative dehydrogenation zones, each of which zones is formed by multiple reactor tubes containing a catalyst bed containing an oxidative dehydrogenation catalyst which is a mixed metal oxide catalyst, as described above. These multiple oxidative dehydrogenation zones for the first oxidative dehydrogenation zone may be arranged in parallel or in series. If they are arranged in parallel, the multiple effluent streams from these multiple oxidative dehydrogenation zones may be mixed together in step c) of the present process.

Step a) of the present process comprises supplying ethane and oxygen to a first oxidative dehydrogenation zone which is formed by multiple reactor tubes containing a catalyst bed containing an oxidative dehydrogenation catalyst, and step b) comprises contacting the ethane and oxygen with the catalyst in the multiple reactor tubes in the first oxidative dehydrogenation zone resulting in multiple effluent streams, wherein the multiple reactor tubes are cooled by a coolant. In step b), part of the ethane supplied to step a) is converted into ethylene. Further, in step b), part of the oxygen supplied to step a) is converted. Preferably, in step b), at most 99% of the oxygen supplied to step a) is converted, more preferably at most 97%, more preferably at most 95%, more preferably at most 92%, most preferably at most 90%. Further, preferably, in step b), at least 80% of the oxygen supplied to step a) is converted, more preferably at least 85%, more preferably at least 87%, more preferably at least 89%, most preferably at least 90%.

Step c) of the present process comprises mixing at least a portion, preferably all, of the multiple effluent streams from step b) resulting in a mixture comprising ethylene, unconverted ethane and unconverted oxygen. That is to say, in step c), effluent streams from the multiple reactor tubes in the first oxidative dehydrogenation zone are mixed. Thus, in step c), either a portion (that is to say, at least two) or, preferably, all of the multiple effluent streams from step b) are mixed.

Preferably, the mixture comprising ethylene, unconverted ethane and unconverted oxygen resulting from step c) comprises at least 1,000 parts per million by volume (ppmv) of unconverted oxygen (volume average oxygen concentration). More preferably, said oxygen concentration is at least 2,000 ppmv, more preferably at least 5,000 ppmv, more preferably at least 10,000 ppmv (=1 vol. %), most preferably at least 2 vol. %. Further, preferably, said oxygen concentration is at most 10 vol. %, more preferably at most 5 vol. %, more preferably at most 3 vol. %, more preferably at most 2 vol. %, most preferably at most 1 vol. %.

Surprisingly, it was found, as demonstrated by the Examples under A. hereinbelow, that at a relatively high conversion of oxygen, a small maldistribution of for example the flow rate yielded a significant and detrimental variation of unconverted oxygen among the effluent streams from multiple reactor tubes, said tubes forming an oxidative dehydrogenation zone within a reactor vessel. Advantageously, in the present invention, such detrimental effect of maldistribution is removed or substantially reduced (i) by using at least two oxidative dehydrogenation zones arranged in series, wherein the first oxidative dehydrogenation zone is formed by multiple reactor tubes as described above, and (ii) by mixing at least a portion of the multiple effluent streams from said first zone before supplying these streams to the second zone for further conversion of unconverted ethane and unconverted oxygen.

Thus, preferably, unconverted oxygen is uniformly or substantially uniformly distributed in the mixture comprising ethylene, unconverted ethane and unconverted oxygen resulting from step c).

Therefore, it is preferred that at least 95 vol. %, more preferably at least 96 vol. %, more preferably at least 97 vol. %, more preferably at least 98 vol. %, more preferably at least 99 vol. %, more preferably at least 99.5 vol. %, more preferably at least 99.6 vol. %, more preferably at least 99.7 vol. %, more preferably at least 99.8 vol. %, most preferably at least 99.9 vol. % of the mixture resulting from step c) has an oxygen concentration which equals the volume average oxygen concentration in the total mixture or which deviates from such average concentration by at most 5%.

Further, alternatively, it is preferred that at least 90 vol. %, more preferably at least 91 vol. %, more preferably at least 92 vol. %, more preferably at least 93 vol. %, more preferably at least 94 vol. %, more preferably at least 95 vol. %, more preferably at least 96 vol. %, more preferably at least 97 vol. %, more preferably at least 98 vol. %, most preferably at least 99 vol. % of the mixture resulting from step c) has an oxygen concentration which equals the volume average oxygen concentration in the total mixture or which deviates from such average concentration by at most 1%.

The mixing in step c) of the present process involves combining at least a portion, preferably all, of the multiple effluent streams from step b). Preferably, the mixing in step c) is carried out in such a way that the above-mentioned uniform or substantially uniform distribution of unconverted oxygen in the mixture comprising ethylene, unconverted ethane and unconverted oxygen resulting from step c) is achieved. Such uniform or substantially uniform mixing can be performed in any way.

For example, in a case wherein the first and second oxidative dehydrogenation zones are comprised within separate, first and second reactor vessels arranged in series, the mixing in step c) can be performed (i) in a bottom part of the first reactor vessel into which bottom part the multiple reactor tubes come out and which bottom part may have a dome shape and (ii) in the pipe or pipes which connect the first reactor vessel to the second reactor vessel wherein said pipe(s) should have such length with which a uniform or substantially uniform mixing can be achieved.

Further, in a case wherein the first and second oxidative dehydrogenation zones are comprised within the same reactor vessel, the mixing in step c) can be performed in the intermediate part of the first reactor vessel between the first and second oxidative dehydrogenation zones into which intermediate part the multiple reactor tubes come out.

Step d) of the present process comprises supplying at least a portion, preferably all, of the mixture from step c) to a second oxidative dehydrogenation zone containing a catalyst bed containing an oxidative dehydrogenation catalyst, and step e) comprises contacting at least a portion of the mixture from step c) with the catalyst in the second oxidative dehydrogenation zone resulting in a stream comprising ethylene and unconverted ethane. In step e), further ethane from the ethane supplied to step a) is converted into ethylene. Further, in step e), further oxygen from the oxygen supplied to step a) is converted. Preferably, in steps b) and e) in combination, at least more than 99% of the oxygen supplied to step a) and any additional oxygen supplied to step d) is converted, more preferably at least 99.1%, more preferably at least 99.2%, more preferably at least 99.3%, more preferably at least 99.48, most preferably at least 99.5%. Further, preferably, in steps b) and e) in combination, at most 99.5% of the oxygen supplied to step a) and any additional oxygen supplied to step d) is converted, more preferably at most 99.8%, more preferably at most 99.9%, more preferably at most 99.95%, more preferably at most 99.98%, more preferably at most 99.99%, most preferably at most 100%. Most preferably, all or substantially all of the remaining oxygen is converted in step e).

Preferably, the stream comprising ethylene and unconverted ethane resulting from step e) comprises no or substantially no unconverted oxygen. More preferably, the oxygen concentration in said stream is at most less than 1,000 ppmv (volume average oxygen concentration), more preferably at most 500 ppmv, more preferably at most 300 ppmv, more preferably at most 200 ppmv, more preferably at most 100 ppmv, more preferably at most 50 ppmv, more preferably at most 20 ppmv, more preferably at most 10 ppmv, more preferably at most 5 ppmv, most preferably at most 1 ppmv.

The oxidative dehydrogenation catalyst in the first oxidative dehydrogenation zone is a mixed metal oxide catalyst, that is to say a catalyst comprising a mixed metal oxide. Preferably, the catalyst in the first oxidative dehydrogenation zone is a heterogeneous catalyst.

Preferably, the catalyst in the first oxidative dehydrogenation zone is a mixed metal oxide catalyst containing molybdenum, vanadium, optionally niobium and optionally tellurium, which catalyst may have the following formula:

$$Mo_1V_aTe_bNb_cO_n$$

wherein:
- a, b, c and n represent the ratio of the molar amount of the element in question to the molar amount of molybdenum (Mo);
- a is from 0.01 to 1, preferably 0.05 to 0.60, more preferably 0.10 to 0.40, more preferably 0.20 to 0.35, most preferably 0.25 to 0.30;
- b is 0 or from >0 to 1, preferably 0.01 to 0.40, more preferably 0.05 to 0.30, more preferably 0.05 to 0.20, most preferably 0.09 to 0.15;
- c is 0 or from >0 to 1, preferably 0.01 to 0.40, more preferably 0.05 to 0.30, more preferably 0.10 to 0.25, most preferably 0.14 to 0.20; and
- n is a number which is determined by the valency and frequency of elements other than oxygen.

Preferably, the catalyst in the first oxidative dehydrogenation zone is a mixed metal oxide catalyst containing tellurium. More preferably, said catalyst is a mixed metal oxide catalyst containing molybdenum, vanadium, niobium and tellurium. Most preferably, said catalyst is a mixed metal oxide catalyst wherein the metals consist of molybdenum, vanadium, niobium and tellurium.

Further, the catalyst in the first oxidative dehydrogenation zone may be a mixed metal oxide catalyst which has the following formula:

$$Mo_1V_aX_bY_cZ_dO_n$$

wherein:
- a, b, c, d and n represent the ratio of the molar amount of the element in question to the molar amount of molybdenum (Mo);
- X is at least one of Nb and Ta;
- Y is at least one of Sb and Ni;
- Z is at least one of Te, Ga, Pd, W, Bi and Al;
- a is from 0.05 to 1;
- b is from 0.001 to 1;
- c is from 0.001 to 1;
- d is from 0.001 to 0.5; and
- n is a number which is determined by the valency and frequency of elements other than oxygen.

Still further, the catalyst in the first oxidative dehydrogenation zone may be a mixed metal oxide catalyst which has the following formula:

$$Mo_1V_aX_bY_cZ_dO_n$$

wherein:
- a, b, c, d, e and n represent the ratio of the molar amount of the element in question to the molar amount of molybdenum (Mo);
- X is at least one of Nb and Ta;
- Y is at least one of Sb and Ni;
- Z is at least one of Te, Ga, Pd, W, Bi and Al;
- M is at least one of Fe, Co, Cu, Cr, Ti, Ce, Zr, Mn, Pb, Mg, Sn, Pt, Si, La, K, Ag and In;
- a is from 0.05 to 1;
- b is from 0.001 to 1;
- c is from 0.001 to 1;
- d is from 0.001 to 0.5;
- e is from 0.001 to 0.3; and
- n is a number which is determined by the valency and frequency of elements other than oxygen.

The oxidative dehydrogenation catalyst in the second oxidative dehydrogenation zone is also a mixed metal oxide catalyst, that is to say a catalyst comprising a mixed metal oxide. Preferably, the catalyst in the second oxidative dehydrogenation zone is a heterogeneous catalyst. The catalyst in the second oxidative dehydrogenation zone may be the same catalyst as the catalyst in the first oxidative dehydrogenation zone. Preferably, these catalysts are different. More preferably, the catalyst in the second oxidative dehydrogenation zone is not a catalyst which falls under the above description of the catalyst in the first oxidative dehydrogenation zone.

The catalyst in the second oxidative dehydrogenation zone may be a mixed metal oxide catalyst which has the following formula:

$$Mo_1V_aX_bY_cZ_dO_n$$

wherein:
- A is at least one metal selected from the group consisting of Pt, Pd, Cu, Ag and Fe;
- a, b, c, d and n represent the ratio of the molar amount of the element in question to the molar amount of molybdenum;
- a is from 0.01 to 1, preferably 0.05 to 0.60, more preferably 0.10 to 0.40, more preferably 0.20 to 0.35, most preferably 0.25 to 0.30;
- b is 0 or from >0 to 1, preferably 0.01 to 0.40, more preferably 0.05 to 0.30, more preferably 0.05 to 0.20, most preferably 0.09 to 0.15;
- c is 0 or from >0 to 1, preferably 0.01 to 0.40, more preferably 0.05 to 0.30, more preferably 0.10 to 0.25, most preferably 0.14 to 0.20;
- d is 0 or from >0 to 0.3, preferably 0.01 to 0.25, more preferably 0.02 to 0.20, more preferably 0.03 to 0.15, most preferably 0.05 to 0.10; and
- n is a number which is determined by the valency and frequency of elements other than oxygen.

Further, the catalyst in the second oxidative dehydrogenation zone may be a mixed metal oxide catalyst which has the following formulas:
a) $Mo_1V_aSb_bNb_cA_dO_n$;
b) $Mo_1V_aSb_bNb_cO_n$;

c) $Mo_1V_aSb_bA_dO_n$; Or d) $Mo_1V_aSb_bO_n$;

wherein:

A is at least one metal selected from the group consisting of Pt, Pd, Cu, Ag and Fe;

a, b, c, d and n represent the ratio of the molar amount of the element in question to the molar amount of molybdenum;

a is from 0.01 to 1, preferably 0.05 to 0.60, more preferably 0.10 to 0.40, more preferably 0.20 to 0.35, most preferably 0.25 to 0.30;

b is from >0 to 1, preferably 0.01 to 0.40, more preferably 0.05 to 0.30, more preferably 0.05 to 0.20, most preferably 0.09 to 0.15;

c is 0 or from >0 to 1, preferably 0.01 to 0.40, more preferably 0.05 to 0.30, more preferably 0.10 to 0.25, most preferably 0.14 to 0.20;

d is 0 or from >0 to 0.3, preferably 0.01 to 0.25, more preferably 0.02 to 0.20, more preferably 0.03 to 0.15, most preferably 0.05 to 0.10; and n is a number which is determined by the valency and frequency of elements other than oxygen.

Preferably, the catalyst in the second oxidative dehydrogenation zone is a mixed metal oxide catalyst which does not contain tellurium. Further, said catalyst may contain molybdenum, vanadium and niobium. More preferably, the catalyst in the second oxidative dehydrogenation zone is a mixed metal oxide catalyst wherein the metals consist of two or more metals selected from the group consisting of the metals from the above-mentioned formulas.

It was found, as demonstrated by the Examples under B. hereinbelow, that in a non-oxidizing environment wherein there is no oxygen or a relatively low amount of oxygen, tellurium may be lost from a mixed metal oxide catalyst containing tellurium. Such tellurium loss may result in a decreasing activity and selectivity (i.e. catalyst deactivation), and hence a less stable catalyst performance. As demonstrated by the Examples under A. hereinbelow, at a relatively high conversion of oxygen, there will be a number of reactor tubes among the multiple reactor tubes, said tubes forming an oxidative dehydrogenation zone within a reactor vessel, wherein there is such non-oxidizing environment possibly leading to tellurium loss in such tubes. In addition to said catalyst deactivation, such loss of tellurium may cause severe operational problems in the section(s) downstream of the catalyst bed, as well as health, safety and environmental issues.

Therefore, it is preferred that in the present invention, the mixed metal oxide catalyst in the second oxidative dehydrogenation zone, wherein there may be such non-oxidizing environment due to further conversion of the remaining oxygen, does not contain tellurium, thereby preventing any tellurium loss and consequently ensuring a stable catalyst performance and preventing above-mentioned issues in downstream section(s). Even though the use of tellurium in a mixed metal oxide catalyst may result in an increased selectivity in the oxidative dehydrogenation of ethane to ethylene, any loss in selectivity is less important in the second oxidative dehydrogenation zone since a substantial part of the oxygen (and ethane) has already been converted in the first oxidative dehydrogenation zone any way.

On the other hand, it is preferred that in the present invention, the mixed metal oxide catalyst in the first oxidative dehydrogenation zone does contain tellurium, because the conversion of oxygen in that first oxidative dehydrogenation zone can be kept relatively low, as further conversion will be effected in the downstream, second oxidative dehydrogenation zone any way, so that any non-oxidizing environment and any subsequent tellurium loss may be prevented and hence a stable catalyst performance for the selective, tellurium-containing catalyst may be ensured and above-mentioned issues in downstream section(s) may be prevented.

In steps b) and e) of the present process, ethylene is produced by oxidative dehydrogenation of ethane. Ethylene is initially formed. However, in said same step, ethylene may be oxidized into acetic acid. Further, in said same step, ethylene may be dehydrogenated into acetylene (ethyne). Ethane may also be directly converted into acetic acid or acetylene. Still further, in said same step, carbon monoxide (CO) and carbon dioxide ($CO_2$) may be produced, for example by combustion of ethane and/or ethylene and/or acetic acid and/or acetylene.

In step a) of the present process, ethane and oxygen ($O_2$) are supplied to the first oxidative dehydrogenation zone. Said components may be fed together or separately to a reactor vessel comprising the first oxidative dehydrogenation zone. That is to say, one or more feed streams comprising one or more of said components may be fed to the reactor vessel. For example, one feed stream comprising oxygen and ethane may be fed to the reactor vessel. Alternatively, one feed stream comprising oxygen and another feed stream comprising ethane may be fed separately to the reactor vessel, which feed streams may form a combined stream inside the reactor vessel. In step a), ethane and oxygen are suitably supplied in the gas phase.

The oxygen supplied to step a) is an oxidizing agent, thereby resulting in oxidative dehydrogenation of ethane. Said oxygen may originate from any source, such as for example air. Ranges for the molar ratio of oxygen to ethane which are suitable, are of from 0.01 to 1, more suitably 0.05 to 0.5. Said ratio of oxygen to ethane is the ratio before oxygen and ethane are contacted with the catalyst in the first oxidative dehydrogenation zone. In other words, said ratio of oxygen to ethane is the ratio of oxygen as fed to ethane as fed. Obviously, after contact with the catalyst, part of the oxygen and ethane gets consumed. The relative amount of oxygen, based on overall feed to step a), may vary within wide ranges and may for example be of from 3 to 50 vol. % or 8 to 40 vol. % or 12 to 30 vol. %.

In the present process, additional oxygen and/or additional ethane, not originating from the first oxidative dehydrogenation zone, may be supplied to the second oxidative dehydrogenation zone, preferably between steps b) and d), more preferably in step c).

In addition to ethane and oxygen, one or more diluents may be supplied to the first oxidative dehydrogenation zone in step a) of the present process. Said one or more diluents may be selected from the group consisting of the noble gases, nitrogen ($N_2$), steam ($H_2O$), methane and carbon dioxide ($CO_2$). Additionally or alternatively, one or more of such diluents not originating from the first oxidative dehydrogenation zone may be supplied to the second oxidative dehydrogenation zone to step d) of the present process.

Preferably, in steps b) and e) of the present process, that is to say during contacting ethane with oxygen in the presence of a catalyst, the temperature is of from 300 to 500° C. More preferably, said temperature is of from 310 to 450° C., more preferably of from 320 to 420° C., most preferably of from 330 to 420° C. Advantageously, the temperatures in the first and second oxidative dehydrogenation zones may be different. In a case wherein the first and second oxidative dehydrogenation zones are formed by multiple reactor tubes, the temperatures in said zones may be varied by applying different inlet coolant temperatures. Furthermore, temperature variation between the two zones may be created by having a second oxidative dehydrogenation zone which is not formed by multiple reactor tubes and which is operated adiabatically without using a coolant. Thus, advantageously, in the present invention the temperatures in the first and second oxidative dehydrogenation zones may be controlled independently, thereby allowing separate control of oxygen conversion and by-product formation, and an optimization of total ethylene selectivity and yield. Further, advantageously, since in the present invention, at least two oxidative dehydrogenation zones are used instead of just one zone, each of these multiple zones may be smaller than in a case where a single oxidative dehydrogenation zone is used, which is beneficial from a safety point of view (higher pressure/containment design).

Still further, in steps b) and e) of the present process, that is to say during contacting ethane with oxygen in the presence of a catalyst, typical pressures are 0.1-30 or 0.1-20 bara (i.e. "bar absolute"). Further, preferably, said pressure is of from 0.1 to 15 bara, more preferably of from 1 to 10 bara, most preferably of from 3 to 10 bara. Said pressure refers to total pressure. The pressures in the first and second oxidative dehydrogenation zones may be different.

In steps b) and e) of the present process, water is formed which ends up in the product stream in addition to the desired ethylene product. Further, as mentioned above, acetic acid, acetylene, carbon monoxide and carbon dioxide may be formed in steps b) and e). Further, some of the ethane is not converted in steps b) and e) and it may be that not all of the oxygen is converted in step e). That is to say, step e) results in an effluent comprising ethylene, optionally acetic acid, unconverted ethane, water, carbon dioxide, optionally unconverted oxygen, optionally carbon monoxide and optionally acetylene.

Water and optionally acetic acid may be removed from at least a portion of the above-mentioned effluent resulting from step e) of the present process. Such water removal step is suitably performed by condensation. Water in the effluent resulting from step e) may be condensed by cooling down the latter effluent to a lower temperature, for example room temperature, after which the condensed water and optionally acetic acid can be separated, resulting in a liquid stream comprising condensed water and optionally acetic acid. A water removal step following step e) may be performed either before or after, preferably before, the below-mentioned optional oxidation step. Additionally, such water removal step can also be applied to at least a portion of the effluent resulting from step b), that is to say between steps b) and d) and between the first and second oxidative dehydrogenation zones.

In an optional oxidation step, before or after the above-mentioned water removal step, carbon monoxide and acetylene may be removed from at least a portion of the effluent resulting from step e) which comprises ethylene, unconverted ethane, carbon dioxide, carbon monoxide and acetylene and which may comprise unconverted oxygen, by means of oxidation of the carbon monoxide and acetylene by oxygen into carbon dioxide, resulting in an effluent comprising ethylene, unconverted ethane and carbon dioxide.

In the above-mentioned optional oxidation step, oxygen is added, that is to say in addition to any oxygen remaining from oxidative dehydrogenation step e). Advantageously, this oxidation step is decoupled from steps b) and e) of the present process so that it is less important how much unconverted oxygen, if any, remains after said oxidative dehydrogenation steps, since in this optional oxidation step exactly that amount of additional oxygen may be added needed to combust the carbon monoxide and acetylene by oxygen, with substantially no oxygen remaining after such oxidation step.

Further, the above-mentioned optional oxidation step may be carried out in the same way as oxygen removal step (c) as described in above-mentioned WO2018153831, the disclosure of which is herein incorporated by reference, except that in the optional oxidation step in the present specification additional oxygen should be added.

In the above-mentioned optional oxidation step, the temperature may vary within wide ranges and is generally of from 50 to 500° C., for example of from 100 to 400° C. Preferably, in said oxidation step, the temperature is in the range of from 100 to 400° C., more preferably 150 to 300° C., most preferably 200 to 260° C. Still further, in said oxidation step, typical pressures are 0.1-30 or 0.1-20 bara (i.e. "bar absolute"). Further, preferably, said pressure is of from 0.1 to 15 bara, more preferably of from 1 to 8 bara, most preferably of from 2 to 7 bara.

Suitably, the stream resulting from the above-mentioned optional oxidation step comprises no oxygen or a residual amount of oxygen which is at most 10,000 parts per million by volume (ppmv) or at most 1,000 ppmv or at most 500 ppmv or at most 100 ppmv or at most 50 ppmv or at most 10 ppmv or at most 2 ppmv or at most 1 ppmv, based on the total volume of the stream resulting from said oxidation step. Further, suitably, in said oxidation step, carbon monoxide and acetylene may be removed to such an extent that the stream resulting from said oxidation step comprises no carbon monoxide and acetylene or a residual amount of carbon monoxide and acetylene which is at most 15 vol. % or at most 10 vol. % or at most 5 vol. % or at most 1 vol. % or at most 500 parts per million by volume (ppmv) or at most 100 ppmv or at most 50 ppmv or at most 10 ppmv or at most 2 ppmv or at most 1 ppmv, based on the total volume of the stream resulting from said oxidation step.

The above-mentioned optional oxidation step may be carried out in the presence of an oxidation catalyst. Suitably, said oxidation catalyst catalyzes the conversion of carbon monoxide, acetylene and oxygen into carbon dioxide by means of oxidation of carbon monoxide and acetylene into carbon dioxide.

Preferably, the oxidation catalyst that may be used in the above-mentioned optional oxidation step comprises a transition metal. More preferably, said catalyst comprises one or more metals selected from the group consisting of nickel (Ni), copper (Cu), zinc (Zn), palladium (Pd), silver (Ag), platinum (Pt), gold (Au), iron (Fe), manganese (Mn), cerium (Ce), tin (Sn), ruthenium (Ru) and chromium (Cr), more preferably one or more metals selected from the group consisting of nickel, copper, zinc, silver, platinum and ruthenium, more preferably one or more metals selected from the group consisting of nickel, copper, zinc, platinum and ruthenium, more preferably one or more metals selected from the group consisting of nickel, copper, zinc and silver, even more preferably one or more metals selected from the group consisting of nickel, copper and zinc. Most preferably, said catalyst comprises copper and/or platinum. Suitably, said catalyst comprises copper or platinum, more suitably copper. For example, said catalyst may comprise copper and zinc. In particular, said catalyst may be a metal oxide catalyst, which may be a partially reduced metal oxide catalyst, wherein the metal(s) is (are) as described above, for example a catalyst comprising copper oxide and optionally zinc oxide. The catalyst may be a supported catalyst, wherein one or more of said metals are carried by a support, or an unsupported catalyst. In case the catalyst is a supported catalyst, the support may be any support, for example alumina, titania, silica, zirconia or silicon carbide, suitably alumina. Further, the supported catalyst may be shaped into any shape, including tablets and extrudates, or coated on a substrate.

Further, the above-mentioned oxidation catalyst that may be used in the above-mentioned optional oxidation step may comprise one or more metals selected from the group consisting of palladium, silver, platinum, gold, copper and ruthenium, or one or more metals selected from the group consisting of palladium, silver, platinum and gold, or platinum.

Further, in a carbon dioxide removal step after the above-mentioned water removal step and optional oxidation step, carbon dioxide may be removed from a stream which comprises ethylene, unconverted ethane and carbon dioxide and which may comprise carbon monoxide and acetylene, for example in case said oxidation step is not performed, resulting in an effluent comprising ethylene, unconverted ethane, optionally carbon monoxide and optionally acetylene.

In the above-mentioned carbon dioxide removal step, carbon dioxide may be removed by any one of well-known methods. A suitable carbon dioxide removal agent that may be fed to said carbon dioxide removal step may be an aqueous solution of a base, for example sodium hydroxide and/or an amine. After such carbon dioxide removal, the stream from which carbon dioxide is removed may be dried to remove any residual water from the stream before it is fed to the next step. Contacting an aqueous solution of an amine with a carbon dioxide containing stream is preferred in a case where the carbon dioxide amount is relatively high, for example in the case of an alkane ODH effluent. Contacting an aqueous solution of sodium hydroxide with a carbon dioxide containing stream is preferred in a case where the carbon dioxide amount is relatively low, for example in the case of an alkane ODH effluent that was treated with an aqueous solution of an amine and which still contains some residual carbon dioxide.

At least a portion of the effluent resulting from a carbon dioxide removal step may be further separated.

In a first case wherein the effluent resulting from a carbon dioxide removal step comprises ethylene and unconverted ethane, the latter stream may be separated into a stream comprising ethylene and a stream comprising unconverted ethane. Unconverted ethane from the latter stream may be recycled to step a) of the present process.

In a second case wherein the effluent resulting from a carbon dioxide removal step comprises ethylene, unconverted ethane, carbon monoxide and acetylene, at least a portion of said effluent is subjected to an acetylene hydrogenation step, wherein acetylene is hydrogenated using hydrogen into ethylene. Such second case may apply in a case wherein the above-mentioned optional oxidation step is not performed. Advantageously, in such step, undesired acetylene is removed by selective hydrogenation of the acetylene to the desired ethylene. In the latter case, there is no need for the above-mentioned optional oxidation step wherein the acetylene would be lost by combustion into carbon dioxide.

In one embodiment of said second case, at least a portion of the effluent resulting from a carbon dioxide removal step may first be separated into a stream comprising carbon monoxide and a stream comprising ethylene, unconverted ethane and acetylene. At least a portion of the latter stream may then be subjected to the acetylene hydrogenation step, resulting in a stream comprising unconverted ethane and ethylene, at least a portion of which latter stream can be further separated into a stream comprising unconverted ethane and a stream comprising ethylene. Unconverted ethane from the latter stream may be recycled to step a) of the present process.

The above-mentioned separations may be performed in any known way, for example by means of distillation, absorption or adsorption, preferably by distillation. Further, the above-mentioned acetylene hydrogenation step is carried out using hydrogen as hydrogenating agent and may be carried out in a catalytic reactor which is a reactor that contains a catalyst. Said catalyst may be any known acetylene hydrogenation catalyst.

The invention is further illustrated by the following Examples.

Examples a. Significant Variation of Unconverted Oxygen

Modelling experiments were carried out. The model in question was a non-isothermal model of a single ethane oxidative dehydrogenation (ODH) reactor tube. In Table 1, the relevant parameters and results are shown.

Table 1 shows data with respect to 4 sets of 3 different ethane ODH cases in the model, wherein each case is operated under slightly different reaction conditions, representing the effect of small tube-to-tube statistical or non-statistical variations of either pressure drop and/or catalyst packing density that will occur in industrial-scale multi-tubular reactors, wherein the reactor tubes are arranged in parallel and together form an ethane ODH zone. These 4 sets of cases are: 1) cases 1a, 1b, 1c; 2) cases 1d, 1e, 1f; 3) cases 2a, 2b, 2c; and 4) cases 2d, 2e, 2f. For each of these sets of 3 cases, there is a base case (a or d) and 2 other cases operated under slightly different conditions (b and c, or e and f), wherein base cases 1a and 1d are identical. In all of said cases, the pressure was 4.5 bar absolute (bara) and a coolant having a certain inlet temperature was used for externally cooling such tubes.

For example, in base cases 1a and 1d, the reaction conditions were chosen such that the oxygen conversion was relatively high, namely 99.92%. Such oxygen conversion corresponded to an outlet oxygen concentration of 99 ppmv. The composition of the inlet stream is shown in Table 1, in terms of oxygen ($O_2$) as oxidizing agent, ethane ($C_2H_6$) as reactant, and nitrogen ($N_2$) and carbon dioxide ($CO_2$) as diluents. Further, Table 1 shows the flow rate and the gas hourly space velocity (GHSV) for each case. The inlet coolant temperature for all cases 1a to 1f and 2a to 2c was 348.0° C.

| Case | Flow rate [l/h] | Rel. flow rate | Rel. catalyst mass | GHSV [Nm³/m³/h] | O₂ [%] | C₂H₆ [%] | N₂ [%] | CO₂ [%] | Conv. C₂H₆ [%] | Conv. O₂ [%] | [O₂]$_{out}$ [ppm] | Rel. increase [O₂]$_{out}$ |
|---|---|---|---|---|---|---|---|---|---|---|---|---|
| 1a | 4157 | 1 | 1 | 2490 | 14 | 56 | 5 | 25 | 36 | 99.92 | 99 | |
| 1b | 3949 | 0.95 | 1 | 2366 | 14 | 56 | 5 | 25 | 36 | >99.99 | <1 | |
| 1c | 4365 | 1.05 | 1 | 2615 | 14 | 56 | 5 | 25 | 36 | 98.60 | 1827 | |
| 1abc | 4157 | 1 | 1 | 2490 | 14 | 56 | 5 | 25 | 36 | 99.48 | 672 | 579% |
| 1d = 1a | 4157 | 1 | 1 | 2490 | 14 | 56 | 5 | 25 | 36 | 99.92 | 99 | |
| 1e | 4116 | 0.99 | 1.01 | 2465 | 14 | 56 | 5 | 25 | 36 | >99.99 | 1 | |
| 1f | 4199 | 1.01 | 0.99 | 2515 | 14 | 56 | 5 | 25 | 36 | 99.50 | 666 | |
| 1def | 4157 | 1 | ? | 2490 | 14 | 56 | 5 | 25 | 36 | 99.81 | 258 | 160% |
| 2a | 4157 | 1 | 1 | 2490 | 19 | 51 | 5 | 25 | 46 | 90.30 | 16419 | |
| 2b | 3949 | 0.95 | 1 | 2366 | 19 | 51 | 5 | 25 | 48 | 96.00 | 6771 | |
| 2c | 4365 | 1.05 | 1 | 2615 | 19 | 51 | 5 | 25 | 44 | 85.10 | 25377 | |
| 2abc | 4157 | 1 | 1 | 2490 | 19 | 51 | 5 | 25 | 46 | 90.29 | 16499 | 0.5% |
| 2d | 4157 | 1 | 1 | 2490 | 14 | 56 | 5 | 25 | 35 | 93.60 | 8236 | |
| 2e | 4116 | 0.99 | 1.01 | 2465 | 14 | 56 | 5 | 25 | 35 | 94.70 | 6836 | |
| 2f | 4199 | 1.01 | 0.99 | 2515 | 14 | 56 | 5 | 25 | 35 | 92.30 | 9804 | |
| 2def | 4157 | 1 | 1 | 2490 | 14 | 56 | 5 | 25 | 35 | 93.53 | 8302 | 0.8% |

As mentioned above, the other 2 cases were operated under slightly different conditions, which conditions were different from those of the base case. For cases 1a, 1b and 1c, the flow rate was varied among the 3 cases. And for cases 1d, 1e and 1f, the catalyst amount and the flow rate were varied among the 3 cases. This represents a variation in a multi-tubular reactor, which may contain of from 1,000 to 50,000 tubes, in terms of flow rate per tube and catalyst amount per tube. In practice, a statistical variation may typically be a variation of a few percent from the average, whereas a non-statistical variation may even be more, e.g. if loading of the catalyst is not executed very carefully. In the model, for cases 1b and 1c a variation of 5% has been taken for the flow rate in the tubes (see column for "Relative flow rate"), and for cases 1e and 1f a variation of 1% has been taken for both the flow rate and the amount of catalyst in the tube (see columns for "Relative flow rate" and "Relative catalyst mass"). A different catalyst packing will result in an increase or decrease in catalyst amount. Tubes that have e.g. a 1% higher amount of catalyst will also have a somewhat higher pressure drop and hence a lower flow rate (e.g. 1%), as also shown in Table 1 for cases 1e and 1f.

As appears from Table 1, operating a case with 5% less flow (case 1b), and hence a lower GHSV and longer contact time, results in an increased 02 conversion and virtually 0 ppmw of 02 in the outlet stream of such a single tube. On the other hand, a case with 5% more flow (case 1c) results in a decreased 02 conversion, namely 98.60% conversion instead of the targeted 99.92% (case 1a).

Case 1abc in Table 1 represents a multi-tubular reactor where ⅓ of the tubes have the average flow (case 1a), ⅓ of the tubes have the 5% lower flow (case 1b) and ⅓ of the tubes have the 5% higher flow (case 1c), wherein the multiple effluent streams from all of these tubes are mixed resulting in a mixture comprising ethylene, unconverted ethane and unconverted oxygen. The model predicts the outlet O₂ concentration of such a mixture to increase significantly from 99 ppmv to 672 ppmv, i.e. an increase of 579% as compared to a multi-tubular reactor where all tubes have the same flow rate from the base case (case 1a).

In base case 2a, also shown in Table 1, the reaction conditions were chosen such (i.e. only increasing the oxygen inlet concentration from 14 vol. % to 19 vol. %) that the oxygen conversion was lower than in base case 1a, namely 90.30% for case 2a as opposed to 99.92% in base case 1a. Further, the same +/−5% variation with respect to flow rate was applied. Similarly, case 2abc in Table 1 represents a multi-tubular reactor where ⅓ of the tubes have the average flow (case 2a), ⅓ of the tubes have the 5% lower flow (case 2b) and ⅓ of the tubes have the 5% higher flow (case 2c), wherein the multiple effluent streams from all of these tubes are mixed resulting in a mixture comprising ethylene, unconverted ethane and unconverted oxygen. The model predicts the outlet O₂ concentration of such a mixture to increase from 16,419 ppmv to 16,499 ppmv, i.e. an increase of only 0.5% as compared to a multi-tubular reactor where all tubes have the same flow rate from the base case (case 2a), which increase is dramatically less than the above-mentioned increase of 579% for case 1abc.

Upon comparing the results for these cases 1a to 1c with those for cases 2a to 2c in the model, it was surprisingly found that at a relatively high conversion of oxygen, a small maldistribution of the flow rate yielded a significant and detrimental variation of unconverted oxygen among the effluent streams from multiple reactor tubes, said tubes forming an oxidative dehydrogenation zone within a reactor vessel. Advantageously, in the present invention, such detrimental effect of maldistribution is removed or substantially reduced (i) by using at least two oxidative dehydrogenation zones arranged in series, wherein the first oxidative dehydrogenation zone is formed by multiple reactor tubes as described above, and (ii) by mixing at least a portion of the multiple effluent streams from said first zone before supplying these streams to the second zone for further conversion of unconverted ethane and unconverted oxygen.

In cases 1a to 1c, the variation of unconverted oxygen among the effluent streams from multiple reactor tubes, together forming a multi-tubular reactor, was caused by a +/−5% variation with respect to flow rate only. In practice, catalyst amount may vary as well, because during loading of thousands or tens of thousands of tubes, some tubes will have a bit more catalyst and other tubes will have a bit less catalyst because of the random nature of the packing. Tubes with a slightly higher packing density will have a slightly higher pressure drop and hence there will be a slightly lower flow rate. Both the higher packing density and the lower flow rate reduce the GHSV resulting in a higher oxygen conversion in such tubes with relatively more catalyst.

Cases 1d to 1f were the same as cases 1a to 1c, except that in cases 1d to 1f the catalyst amount was varied by +/−1% and, following the above rationale, combined with a +/−1% variation with respect to flow rate, as opposed to a +/−5% variation with respect to flow rate for cases 1a to 1c. It has appeared that also with a variation of only +/−1% with respect to amount of catalyst and only +/−1% with respect to flow rate, as in cases 1d to 1f, there was still a significant increase of 160% in the outlet $O_2$ concentration of a mixture comprising ethylene, unconverted ethane and unconverted oxygen resulting from mixing multiple effluent streams from all tubes of a multi-tubular reactor, from (i) a case wherein all tubes from such a multi-tubular reactor have the same flow rate from the base case (case 1d) where the outlet $O_2$ concentration was only 99 ppmv to (ii) a case, where ⅓ of the tubes have the average flow (case 1d), ⅓ of the tubes have the 1% lower flow (case 1e) and ⅓ of the tubes have the 1% higher flow (case 1f) where the outlet $O_2$ concentration was 258 ppmv (case 1def).

There may also be other means to target for a reduced oxygen conversion, other than an increased oxygen inlet concentration as demonstrated above with reference to base case 2a, such as a lowered inlet coolant temperature. In base case 2d, also shown in Table 1, the reaction conditions were chosen such (i.e. only lowering the inlet coolant temperature from 348.0° C. to 344.5° C.) that the oxygen conversion was lower than in base case 1d, namely 93.60% for case 2d as opposed to 99.92% in base case 1d. Further, the same +/−1% variation with respect to catalyst amount and flow rate was applied. Similarly, case 2def in Table 1 represents a multi-tubular reactor where ⅓ of the tubes have the average flow (case 2d), ⅓ of the tubes have the 1% lower flow (case 2e) and ⅓ of the tubes have the 1% higher flow (case 2f), wherein the multiple effluent streams from all of these tubes are mixed resulting in a mixture comprising ethylene, unconverted ethane and unconverted oxygen. The model predicts the outlet $O_2$ concentration of such a mixture to increase from 8,236 ppmv to 8,302 ppmv, i.e. an increase of only 0.8% as compared to a multi-tubular reactor where all tubes have the same flow rate from the base case (case 2d), which increase is dramatically less than the above-mentioned increase of 160% for case 1def. Thus, the above surprising finding resulting from comparing cases 1a to 1c with cases 2a to 2c (+/−5% variation in flow rate), was confirmed upon comparing the results for cases 1d to 1f with cases 2d to 2f (+/−1% variation in amount of catalyst and in flow rate).

Such increase in the (total) outlet $O_2$ concentration of a multi-tubular reactor which is operated at a relatively high oxygen conversion, as demonstrated above for cases 1abc and 1def, is disadvantageous in that a resulting relatively high oxygen concentration in the back-end separation section increases the risk of explosion hazards as further discussed in the "Background of the invention" section of this specification. Furthermore, it has appeared that in some (individual) tubes there will be either no oxygen or a relatively low outlet Oz concentration (see cases 1b and 1e in Table 1). It was found (see Section B. below) that such non-oxidizing environment, that may be present especially near the outlet of some catalyst bed containing reactor tubes, may disadvantageously result in the deactivation of a mixed metal oxide ethane ODH catalyst that may be present in such reactor tubes.

B. Loss of Tellurium in the Absence of Oxygen

B.1 Preparation of the Catalyst

A mixed metal oxide catalyst containing molybdenum (Mo), vanadium (V), niobium (Nb) and tellurium (Te) was prepared, for which catalyst the molar ratio of said 4 metals was $Mo_1V_{0.29}Nb_{0.17}Te_{0.12}$.

Two solutions were prepared. Solution 1 was obtained by dissolving 15.8 g of ammonium niobate oxalate and 4.0 g of oxalic acid dihydrate in 160 ml of water at room temperature. Solution 2 was prepared by dissolving 35.6 g of ammonium heptamolybdate, 6.9 g of ammonium metavanadate and 5.8 g of telluric acid ($Te(OH)_6$) in 200 ml of water at 70° C. 7.0 g of concentrated nitric acid was then added to solution 2. The 2 solutions were combined which yielded an orange gel-like precipitate. The mixture was evaporated to dryness with the aid of a rotating evaporator ("rotavap") at 50° C.

The dried material was further dried in static air at 120 0° C. for 16 hours, milled to a fine powder and then calcined in static air at a temperature of 325° C. for 2 hours. After the air calcination, the material was further calcined in a nitrogen ($N_2$) stream at 600° C. for 2 hours. Then the material was treated with an aqueous 5% oxalic acid solution at 80° C. and filtered and dried at 120° C.

The dried catalyst powder was pressed into pills which pills were then milled. The milled material was then sieved using a sieve having a mesh size of 40-80 mesh. The sieved material, having a size of 40-80 mesh and composed of porous catalyst particles, was then used in the ethane oxidative dehydrogenation experiments described below.

B.2 Catalytic Oxidative Dehydrogenation of Ethane

The catalyst thus prepared was used in experiments involving ethane oxidative dehydrogenation (ethane ODH) within a small-scale testing unit comprising a vertically oriented, cylindrical, quartz reactor having an inner diameter of 3.0 mm. 0.65 g of the catalyst was loaded in the reactor. The catalyst bed height was 6 cm. On top of the catalyst bed, another bed having a height of 8 cm was placed which latter bed contained inert silicon carbide (Sic) particles having an average diameter of 0.8 mm.

In these experiments, a gas stream comprising 63 vol. % of ethane, 21 vol. % of oxygen ($O_2$) and 16 vol. % of nitrogen ($N_2$) was fed to the top of the reactor and then sent downwardly through the catalyst bed to the bottom of the reactor. Said gas stream was a combined gas stream comprising a flow of ethane having a rate of 3.00 Nl/hr, a flow of oxygen having a rate of 1.00 Nl/hr and a flow of nitrogen having a rate of 0.77 Nl/hr. "Nl" stands for "normal litre" as measured at standard temperature and pressure, namely 0° C. and 1 bara (100 kPa). The pressure in the reactor was 2.3 bara. The reactor was heated such that the temperature of the catalyst (at the end of the catalyst bed) was 370° C.

The conversion of ethane and the product composition were measured with a gas chromatograph (GC) equipped with a thermal conductivity detector (TCD) and with another GC equipped with a flame ionization detector. Acetic acid by-product and water from the reaction were trapped in a quench pot.

The above conditions (hereinafter referred to as "reference conditions") were maintained for 100 hours (Period A). Under these conditions, the oxygen conversion was not complete and the gas stream coming out of the reactor outlet comprised (unconverted) oxygen in an amount of 3.85 vol. %, based on the total volume of the gas stream (i.e. an oxidizing environment).

Then the oxygen flow rate was decreased from 1.00 to 0.60 Nl/hr. Further, the nitrogen flow rate was increased from 0.77 to 1.17 Nl/hr, so that the total flow rate was not changed. Under these conditions, the oxygen conversion was complete and the gas stream coming out of the reactor outlet did not comprise oxygen (i.e. a non-oxidizing environment).

The latter conditions were maintained for 60 hours (Period B), and then the above-mentioned reference conditions were restored and maintained for 25 hours (Period C).

In Table 2 below, the experimental results (conversion of ethane and selectivity towards ethylene) for above-mentioned Periods A and C are shown.

TABLE 2

| Period | Conversion of ethane (%) | Selectivity to ethylene (%) |
|--------|--------------------------|------------------------------|
| A | 41.3 | 92.9 |
| C | 37.1 | 90.9 |

It appeared that after a period wherein the gas stream coming out of the reactor outlet comprised no oxygen (above-mentioned Period B), in which case a non-oxidizing environment was created in the reactor, especially near the outlet of the reactor where no oxygen was present because of complete oxygen consumption, the conversion and selectivity dropped significantly in a subsequent period wherein the gas stream coming out of the reactor outlet comprised oxygen again by increasing the oxygen flow rate to its original level (above-mentioned Period C), as compared to the period before the oxygen flow rate was decreased (above-mentioned Period A).

Further, it was found that in above-mentioned Period B, wherein there was a non-oxidizing environment, tellurium was lost from the catalyst in the reactor which tellurium ended up in the reactor outlet stream.

Based on the above, it is concluded that the above-described decrease in activity and selectivity (i.e. catalyst deactivation) was caused by the loss of tellurium from the catalyst in a non-oxidizing environment. In addition to said catalyst deactivation, such loss of tellurium may cause severe operational problems in the section(s) downstream of the catalyst bed, as well as health, safety and environmental issues.

Therefore, it is preferred that in the present invention, the mixed metal oxide catalyst in the second oxidative dehydrogenation zone does not contain tellurium.

We claim:

1. A process for the production of ethylene by oxidative dehydrogenation of ethane, comprising:
   a) contacting ethane and oxygen in a first oxidative dehydrogenation zone which is formed by multiple reactor tubes each containing a catalyst bed containing a first mixed metal oxide catalyst, resulting in multiple effluent streams, wherein the multiple reactor tubes are cooled by a coolant;
   b) mixing at least a portion of the multiple effluent streams to produce a mixture comprising ethylene, unconverted ethane and unconverted oxygen having a volume average oxygen concentration, at least 90 vol. % of said mixture having an oxygen concentration which equals the volume average oxygen concentration, or which deviates from the average volume oxygen concentration by at most 1%;
   c) contacting at least a portion of the mixture from step b) in a second oxidative dehydrogenation zone which is formed by multiple reactor tubes each containing a catalyst bed containing a second mixed metal oxide catalyst, resulting in a stream comprising ethylene, unconverted ethane, and less than 500 ppmv of unconverted oxygen.

2. The process according to claim 1, wherein the first and second oxidative dehydrogenation zones are comprised within the same reactor vessel or within separate reactor vessels arranged in series.

3. The process according to claim 1, wherein 80% to 99% of the oxygen supplied to step a) is converted.

4. The process according to claim 1, wherein the mixture resulting from step b comprises from 1,000 ppmv to 10 vol. % of unconverted oxygen.

5. The process according to claim 1, wherein more than 99% to 100% of the oxygen supplied to the process is converted.

6. The process according to claim 1, wherein the mixture resulting from step c) comprises less than 200 ppmv of unconverted oxygen.

7. The process according to claim 1, wherein the first mixed metal oxide catalyst contains tellurium.

8. The process according to claim 7, wherein the first mixed metal oxide catalyst further contains molybdenum, vanadium, and niobium.

9. The process according to claim 1, wherein the second mixed metal oxide catalyst does not contain tellurium.

10. The process according to claim 9, wherein the second mixed metal oxide catalyst contains molybdenum, vanadium and niobium.

* * * * *